(12) United States Patent
Saito

(10) Patent No.: US 6,808,765 B2
(45) Date of Patent: Oct. 26, 2004

(54) LIQUID CRYSTAL COMPOSITION AND LIQUID CRYSTAL DISPLAY ELEMENT

(75) Inventor: Masayuki Saito, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 10/697,879

(22) Filed: Oct. 31, 2003

(65) Prior Publication Data

US 2004/0089844 A1 May 13, 2004

(30) Foreign Application Priority Data

Oct. 31, 2002 (JP) ........................................ 2002-317432

(51) Int. Cl.$^7$ ........................ C09K 19/34; C09K 19/30; C09K 19/12; C09K 19/20
(52) U.S. Cl. .............. 428/1.1; 252/299.61; 252/299.63; 252/299.66; 252/299.67
(58) Field of Search ...................... 428/1.1; 252/299.61, 252/299.63, 299.66, 299.67

(56) References Cited

U.S. PATENT DOCUMENTS

| | | | |
|---|---|---|---|
| 5,032,313 A | 7/1991 | Goto et al. | |
| 5,618,466 A | 4/1997 | Tomi et al. | |
| 5,645,759 A | 7/1997 | Tomi et al. | |
| 5,961,881 A | 10/1999 | Andou et al. | |
| 6,007,740 A | 12/1999 | Andou et al. | |
| 6,235,355 B1 * | 5/2001 | Haseba et al. ................ 428/1.1 |
| 6,315,922 B1 | 11/2001 | Takeshita et al. | |
| 6,325,949 B1 * | 12/2001 | Takeshita et al. ...... 252/299.63 |
| 6,399,163 B1 | 6/2002 | Tomi et al. | |
| 6,497,929 B1 | 12/2002 | Miyairi et al. | |
| 6,572,938 B2 * | 6/2003 | Yanai et al. .................. 428/1.1 |
| 6,641,872 B2 * | 11/2003 | Kubo et al. .................. 428/1.1 |
| 6,649,227 B2 * | 11/2003 | Kato et al. .................... 428/1.1 |
| 6,703,083 B2 * | 3/2004 | Kato et al. .................... 428/1.1 |
| 2002/0033472 A1 | 3/2002 | Kato et al. | |
| 2002/0047103 A1 | 4/2002 | Sagou et al. | |
| 2002/0066887 A1 | 6/2002 | Yanai et al. | |

FOREIGN PATENT DOCUMENTS

| | | |
|---|---|---|
| EP | 1 160 250 | 12/2001 |
| JP | 10-231482 | 9/1998 |
| JP | 10-298127 | 11/1998 |
| JP | 2002-309255 | * 10/2002 |

\* cited by examiner

Primary Examiner—Shean C. Wu
(74) Attorney, Agent, or Firm—Wenderoth, Lind & Ponack, L.L.P.

(57) ABSTRACT

A liquid crystal composition comprising; as a first component, at least one compound selected from a group of compounds represented by Formula (1); as a second component, at least one compound selected from a group of compounds represented by Formula (2); as a third component, at least one compound selected from a group of compounds represented by Formula (3); as a forth component, at least one compound selected from a group of compounds represented by Formula (4); and as a fifth component, at least one compound selected from a group of compounds represented by Formulas (5-1) and (5-2), in which each compound represented by the Formula (1) to (5-2) is defined in the specification.

54 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates mainly to a liquid crystal composition suitable for use in an active matrix (AM) element and an AM element comprising the composition.

2. Related Art

Classification of a liquid crystal display element based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA) and so on. Classification based on a driving mode of liquid crystals includes passive matrix (PM) and active matrix (AM). PM is classified into static, multiplex and so on and AM is classified into thin film transistor (TFT), metal insulator metal (MIM) and so on. Classification of TFT includes amorphous silicon and polycrystal silicon. The latter is classified into a high temperature type and a low temperature type according to a production process. Classification based on a light source includes a reflection type using a natural light, a transmission type using a backlight and a semi-transmission type using both.

These liquid crystal display elements comprise liquid crystal compositions having appropriate characteristics. It is necessary to improve general characteristics of the compositions in order to obtain AM elements having good general characteristics. Relation between the general characteristics of the element and those of the composition is summarized in Table 1. The general characteristics of the compositions shall be explained further based on commercially available AM elements. A temperature range of a nematic phase is related to a temperature range usable for the element. Preferably, the upper limit temperature in a nematic phase is 70° C. or more and the lower limit temperature in a nematic phase is −20° C. or less. Viscosity of the compositions is related to response time of the elements. Short response time is preferable for displaying a moving picture on the elements. Consequently, a low viscosity of the composition is preferable, and a low viscosity at low temperatures is more preferable.

TABLE 1

General characteristics required for a liquid crystal composition and an AM element

| No. | General characteristics of a composition | General characteristics required for an AM element |
|---|---|---|
| 1 | Wide nematic phase temperature range | Wide usable temperature range |
| 2 | Low viscosity[1)] | Short response time |
| 3 | Appropriate optical anisotropy | High contrast ratio |
| 4 | Low threshold voltage | Low power consumption high contrast ratio |
| 5 | High resistivity | High voltage holding ratio High contrast ratio |

[1)]The composition can be put into a liquid crystal cell in shorter time.

Optical anisotropy of the compositions is related to a contrast ratio of the elements. A product (Δ·d) of optical anisotropy (Δn) of the compositions and a cell gap (d) of the elements is designed to be approximately 0.45 μm to maximize a contrast ratio. Consequently, optical anisotropy of the compositions is mainly in the range of 0.08 to 0.12. A low threshold voltage of the compositions contributes to a low power consumption and a high contrast ratio of the elements. Consequently, a low threshold voltage is preferable. A high resistivity of the compositions contributes to a high voltage holding ratio and a high contrast ratio of the elements. Consequently, the compositions having a high resistivity in the initial stage are preferable. The compositions having a high resistivity even after using for a long time are preferable.

AM-TFT elements having polycrystal silicon produced at low temperature are driven at a very large frequency in comparison with AM-TFT elements having amorphous silicon. Accordingly, for the former elements, the compositions in which dielectric anisotropy has a low frequency dependence are preferable. The compositions having a low frequency dependence at low temperatures are more preferable. Especially desired are liquid crystal compositions which are also usable in the AM-TFT elements having polycrystal silicon produced at low temperatures. Related compositions hitherto known are disclosed in the following patents; JP 2-233626 A (1990) (EP 1179522 A), JP 8-73856 A (1996), JP 8-73857 A (1996), JP 10-204436 A (1998), JP 10-231482 A (1998), JP 10-298127 A (1998), JP 2000-144135 A (2000), JP 2001-3053 A (2001), JP 2001-123170 A (2001), JP 2001-288470 A (2001), JP 2001-335586 A (2001), JP 2001-342195 A (2001), and JP 2002-20344 A (2002).

SUMMARY OF THE INVENTION

The present invention comprises the following A and B.

A. A liquid crystal composition comprising; as a first component, at least one compound selected from a group of compounds represented by Formula (1); as a second component, at least one compound selected from a group of compounds represented by Formula (2); as a third component, at least one compound selected from a group of compounds represented by Formula (3); as a forth component, at least one compound selected from a group of compounds represented by Formula (4); and as a fifth component, at least one compound selected from a group of compounds represented by Formulas (5-1) and (5-2).

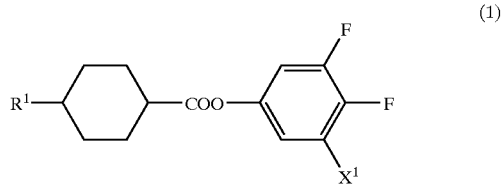

(1)

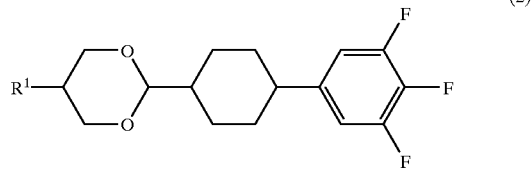

(2)

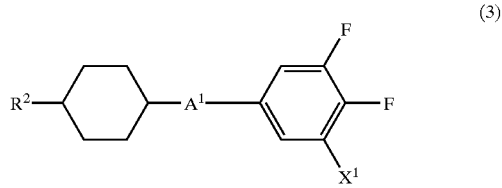

(3)

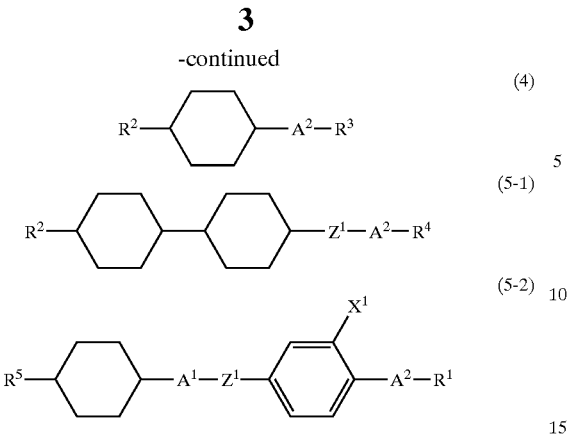

wherein $R^1$ is alkyl; $R^2$ is alkyl or alkenyl; $R^3$ is alkyl, alkoxy, or —$CF_3$; $R^4$ is alkyl or alkoxy; $R^5$ is alkyl or alkoxymethyl; $A^1$ is 1,4-cyclohexylene or 1,4-phenylene in which any hydrogen may be replaced by fluorine; $A^2$ is 1,4-cyclohexylene or 1,4-phenylene; $Z^1$ is a single bond or —COO—; and $X^1$ is hydrogen or fluorine.

B. A liquid crystal display element comprising the liquid crystal composition described above.

DETAILED DESCRIPTION

An object of the present invention is to provide a liquid crystal composition which satisfies plural characteristics in the general characteristics of a composition, a low threshold voltage, a high resistivity, and a low frequency dependence. Low frequency dependence means that frequency dependence of dielectric anisotropy is low. Another object is to provide a liquid crystal composition having plural characteristics appropriately balanced. A further object is to provide a liquid crystal display element comprising the composition and especially having a high voltage holding ratio. A still further object is to provide an AM-TFT element having polycrystal silicon produced at low temperatures.

The present invention comprises the following items 1 to 20.

1. A liquid crystal composition comprising; as a first component, at least one compound selected from a group of compounds represented by Formula (1); as a second component, at least one compound selected from a group of compounds represented by Formula (2); as a third component, at least one compound selected from a group of compounds represented by Formula (3); as a forth component, at least one compound selected from a group of compounds represented by Formula (4); and as a fifth component, at least one compound selected from a group of compounds represented by Formulas (5-1) and (5-2).

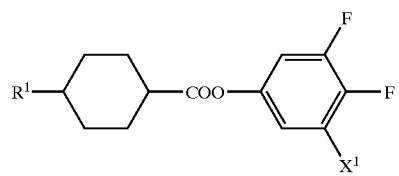

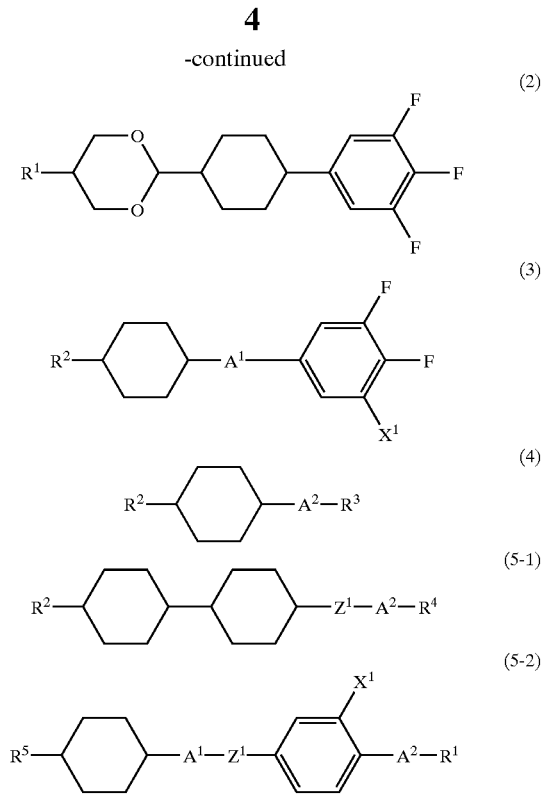

wherein $R^1$ is alkyl; $R^2$ is alkyl or alkenyl; $R^3$ is alkyl, alkoxy, or —$CF_3$; $R^4$ is alkyl or alkoxy; $R^5$ is alkyl or alkoxymethyl; $A^1$ is 1,4-cyclohexylene or 1,4-phenylene in which any hydrogen may be replaced by fluorine; $A^2$ is 1,4-cyclohexylene or 1,4-phenylene; $Z^1$ is a single bond or —COO—; and $X^1$ is hydrogen or fluorine.

2. The liquid crystal composition as described in the above item 1, wherein the fifth component is at least one compound selected from a group of compounds represented by Formula (5-1).

3. The liquid crystal composition as described in the above item 1, wherein the fifth component is at least one compound selected from a group of compounds represented by Formula (5-2).

4. The liquid crystal composition as described in the above item 1, wherein the first component is in the range of 5 to 30% by weight, the second component is in the range of 10 to 40% by weight, the third component is in the range of 10 to 50% by weight, the forth component is in the range of 3 to 30% by weight, and the fifth component is in the range of 3 to 40% by weight, each based on the total weight of the composition.

5. The liquid crystal composition as described in the above item 2, wherein the first component is in the range of 5 to 30% by weight, the second component is in the range of 10 to 40% by weight, the third component is in the range of 10 to 50% by weight, the forth component is in the range of 3 to 30% by weight, and the fifth component is in the range of 3 to 40% by weight, each based on the total weight of the composition.

6. The liquid crystal composition as described in the above item 3, wherein the first component is in the range of 5 to 30% by weight, the second component is in the range of 10 to 40% by weight, the third component is in the range of 10 to 50% by weight, the forth component is in the range of 3 to 30% by weight, and the fifth component is in the range of 3 to 40% by weight, each based on the total weight of the composition.

7. The liquid crystal composition as described in the above item 1, further comprising, as a sixth component, at least one compound selected from a group of compounds represented by Formula (6).

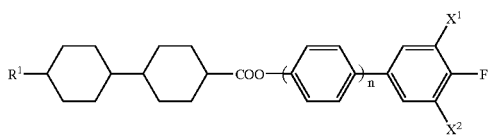
(6)

wherein $R^1$ is alkyl; $X^1$ and $X^2$ independently are hydrogen or fluorine; and n is 0 or 1.

8. The liquid crystal composition as described in the above item 2, further comprising, as a sixth component, at least one compound selected from a group of compounds represented by Formula (6).

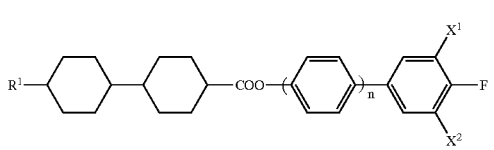
(6)

wherein $R^1$ is alkyl; $X^1$ and $X^2$ independently are hydrogen or fluorine; and n is 0 or 1.

9. The liquid crystal composition as described in the above item 3, further comprising, as a sixth component, at least one compound selected from a group of compounds represented by Formula (6).

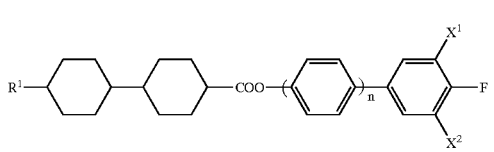
(6)

wherein $R^1$ is alkyl; $X^1$ and $X^2$ independently are hydrogen or fluorine; and n is 0 or 1.

10. The liquid crystal composition as described in the above item 4, further comprising, as a sixth component, at least one compound selected from a group of compounds represented by Formula (6).

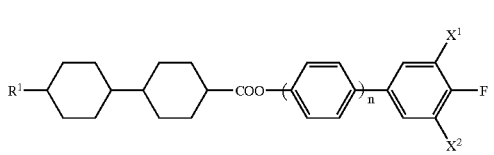
(6)

wherein $R^1$ is alkyl; $X^1$ and $X^2$ independently are hydrogen or fluorine; and n is 0 or 1.

11. The liquid crystal composition as described in the above item 5, further comprising, as a sixth component, at least one compound selected from a group of compounds represented by Formula (6).

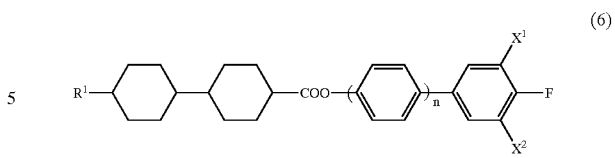
(6)

wherein $R^1$ is alkyl; $X^1$ and $X^2$ independently are hydrogen or fluorine; and n is 0 or 1.

12. The liquid crystal composition as described in the above item 6, further comprising, as a sixth component, at least one compound selected from a group of compounds represented by Formula (6).

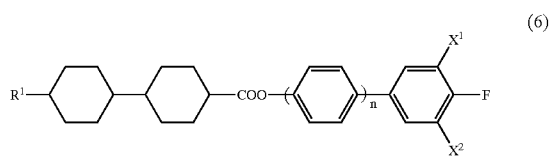
(6)

wherein $R^1$ is alkyl; $X^1$ and $X^2$ independently are hydrogen or fluorine; and n is 0 or 1.

13. The liquid crystal composition as described in the above item 7, wherein the sixth component is in the range of 1 to 40% by weight based on the total weight of the composition.

14. The liquid crystal composition as described in the above item 8, wherein the sixth component is in the range of 1 to 40% by weight based on the total weight of the composition.

15. The liquid crystal composition as described in the above item 9, wherein the sixth component is in the range of 1 to 40% by weight based on the total weight of the composition.

16. The liquid crystal composition as described in the above item 10, wherein the sixth component is in the range of 1 to 40% by weight based on the total weight of the composition.

17. The liquid crystal composition as described in the above item 11, wherein the sixth component is in the range of 1 to 40% by weight based on the total weight of the composition.

18. The liquid crystal composition as described in the above item 12, wherein the sixth component is in the range of 1 to 40% by weight based on the total weight of the composition.

19. A liquid crystal display element comprising the liquid crystal composition as described in any one of the above items 1 to 18.

20. The liquid crystal display element as described in the above item 19, wherein the liquid crystal display element is an AM element.

Technical terms used herein have the following meanings. The liquid crystal composition(s) or liquid crystal display element(s) of the present invention may be abbreviated to "the composition(s)" or "the element(s)", respectively. A liquid crystal display element(s) is a generic term for a liquid crystal display panel(s) and a liquid crystal display module (s). A main component of a liquid crystal composition is a liquid crystal compound(s). The liquid crystal compound is a generic term for a compound having a liquid crystal phase such as a nematic phase, a smectic phase and so on, and a compound having no liquid crystal phase, but useful as a component of the composition. At least one compound selected from a group of compounds represented by Formula (1) may be abbreviated to "compound (1)". Compounds represented by any other formulas may be abbreviated in a similar manner.

The upper limit temperature of a nematic phase may be abbreviated to "upper limit temperature". The lower limit temperature of a nematic phase may be abbreviated to "lower limit temperature". "High resistivity" means that the composition has a high resistivity in the initial stage and even after using over a long period of time. "High voltage holding ratio" means that an element has a high voltage holding ratio in the initial stage and even after using over a long period of time. Characteristics such as optical anisotropy are explained using the values measured according to the respective methods written in the Examples. A component ratio (percentage) in a composition is in terms of weight percentage (% by weight) based on the total weight of the composition.

In the chemical formulas of the compounds as a component, symbol $R^1$ is used for plural compounds. In these compounds, $R^1$ may have the same or different meaning. In one case, for example, $R^1$ of the compound (1) is ethyl and $R^1$ of the compound (2) is ethyl. In another case, $R^1$ of the compound (1) is ethyl and $R^1$ of the compound (2) is propyl. This rule is also applied to symbols $R^2$, $R^3$, $R^4$, $R^5$, $R^6$, $A^1$, $A^2$, $X^1$, and $X^2$.

The compositions of the present invention satisfy plural characteristics in the general characteristics of a composition, a low threshold voltage, a high resistivity, and a low frequency dependence. "Low frequency dependence" means that frequency dependence of the dielectric anisotropy is low. The compositions have plural characteristics that are appropriately balanced. The elements comprising the compositions have an especially large voltage holding ratio. The compositions are especially suitable for an AM-TFT element having polycrystal silicon produced at low temperatures.

The compositions of the present invention shall be explained in the following order: Firstly, constitution of components in the present compositions; secondly, main characteristics of component compounds and their main effects on the composition; thirdly, a preferred ratio of component compounds and reasons therefor; fourthly, preferred embodiments of component compounds; fifthly, concrete examples of component compounds; and sixthly, a method for the preparation of a component compound.

Firstly, constitution of components in the present compositions is explained. There are six types of combination of component compounds. Types 1 to 6 are summarized in Table 2, wherein the component compounds in each of types 1 to 6 are indicated by the symbol of a circle. A blank column denotes that no corresponding compound is used as a component. In type 1, for example, compounds (1), (2), (3), (4), (5-1), and (5-2) are the components of the composition.

TABLE 2

| | Comp. (1) | Comp. (2) | Comp. (3) | Comp. (4) | Comp. (5-1) | Comp. (5-2) | Comp. (6) |
|---|---|---|---|---|---|---|---|
| Type 1 | ○ | ○ | ○ | ○ | ○ | ○ | |
| Type 2 | ○ | ○ | ○ | ○ | ○ | | |

TABLE 2-continued

| | Comp. (1) | Comp. (2) | Comp. (3) | Comp. (4) | Comp. (5-1) | Comp. (5-2) | Comp. (6) |
|---|---|---|---|---|---|---|---|
| Type 3 | ○ | ○ | ○ | ○ | | ○ | |
| Type 4 | ○ | ○ | ○ | ○ | ○ | ○ | ○ |
| Type 5 | ○ | ○ | ○ | ○ | ○ | | ○ |
| Type 6 | ○ | ○ | ○ | ○ | | ○ | ○ |

The compositions of the present invention are classified into Composition A and Composition B. Composition A may further comprise other compounds different from compounds (1) to (6), such as a liquid crystal compound, an additive, and so on. The liquid crystal compound is mixed into the composition for the purpose of adjusting the characteristics. The additive is an optically active compound, a coloring matter, and so on. The optically active compound is mixed into the composition for the purpose of inducing a helical structure of liquid crystals to give a twist angle. The coloring matter is mixed into the composition to make it applicable to an element of GH (Guest host) mode.

Composition B consists essentially of compounds selected from the compounds (1) to (6). The term "essentially" here means that the composition contains no liquid crystal compound which is different from these compounds. The term also means that the composition may further comprise compounds such as impurities contained in these compounds, an optically active compound, a coloring matter, and so on. The number of components in Composition B is smaller than that in Composition A. Composition B is more preferable to Composition A in terms of cost. On the other hand, Composition A is preferable to Composition B in that the physical properties of Composition A can be adjusted further by mixing other liquid crystal compounds.

Secondly, main characteristics of component compounds and their main effects on the composition are explained. Main characteristics of the compounds are summarized in Table 3, wherein "L" means large or high, "M" means middle, and "s" means small or low. "0" means that the dielectric anisotropy is nearly zero (or extremely small). Symbols "L", "M" and "S" are based on relative evaluation of these compounds.

TABLE 3

| Characteristics of the compounds | (1) | (2) | (3) | (4) | (5-1) | (5-2) | (6) |
|---|---|---|---|---|---|---|---|
| Upper limit temperature | S | M | M | S | M | L | M–L |
| Viscosity | M | L | M | S | M | M | M–L |
| Optical anisotropy | M | M | M–L | S–M | S–M | M–L | M |
| Dielectric anisotropy | M | L | M | 0 | 0 | 0 | M |
| Frequency dependence of dielectric anisotropy | S–M | M | M | S | S | S | M–L |

Compounds (1) to (6) increase resistivity of the composition. A compound having a high upper limit temperature elevates the upper limit temperature of the composition. A compound having a low viscosity decreases the viscosity of the composition. A compound having a small optical anisotropy decreases the optical anisotropy of the composition. A compound having a large dielectric anisotropy decreases the threshold voltage of the composition. A compound having a low frequency dependence of dielectric anisotropy decreases the frequency dependence of dielectric anisotropy of the composition.

Thirdly, preferred ratios of component compounds and the reasons therefor are explained. A preferred ratio of compound (1) is 5% or more for reducing the threshold voltage or decreasing the frequency dependence of the composition and 30% or less for reducing the lower limit temperature of the composition. A more preferred ratio is 5 to 20%. A preferred ratio of compound (2) is 10% or more for reducing the threshold voltage of the composition and 40% or less for reducing the lower limit temperature of the composition. A more preferred ratio is 15 to 30%. A preferred ratio of compound (3) is 10% or more for decreasing the viscosity or adjusting the threshold voltage of the composition and 50% or less for reducing the lower limit temperature of the composition. A more preferred ratio is 15 to 40%.

A preferred ratio of compound (4) is 3% or more for decreasing the viscosity of the composition and 30% or less for reducing the lower limit temperature of the composition. A more preferred ratio is 5 to 20%. A preferred ratio of compound (5-1) or (5-2) is 3% or more for elevating the upper limit temperature of the composition and 40% or less for reducing the lower limit temperature of the composition. A more preferred ratio is 5 to 25%. Compound (6) is mixed into the composition for further adjusting the threshold voltage and upper limit temperature. A preferred ratio of this compound is 1% or more for adjusting the characteristics of the composition and 40% or less for reducing the lower limit temperature of the composition. A more preferred ratio is 1 to 35%.

Fourthly, preferred embodiment of a component compound are explained. Preferred $R^1$ is alkyl having 1 to 10 carbons. Preferred $R^2$ is alkyl having 1 to 10 carbons or alkenyl having 2 to 10 carbons. Preferred $R^3$ is alkyl having 1 to 10 carbons, alkoxy having 1 to 10 carbons or —$CF_3$. Preferred $R^4$ is alkyl having 1 to 10 carbons or alkoxy having 1 to 10 carbons. Preferred $R^5$ is alkyl having 1 to 10 carbons or alkoxymethyl having 1 to 10 carbons. Preferred $R^6$ is alkyl having 1 to 10 carbons.

Preferred alkyl is methyl, ethyl, propyl, butyl, pentyl, hexyl, heptyl, or octyl. More preferable is ethyl, propyl, butyl, pentyl, or heptyl.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More preferable is vinyl, 1-propenyl, 3-butenyl, or 3-pentenyl. A preferred configuration of —CH=CH— in these alkenyl groups depends on the position of the double bond. In the alkenyl such as 1-propenyl, 1-butenyl, 1-pentenyl, 1-hexenyl, 3-pentenyl and 3-hexenyl, trans configuration is preferable. In the alkenyl such as 2-butenyl, 2-pentenyl and 2-hexenyl, cis configuration is preferable.

Preferred alkoxy is methoxy, ethoxy, propoxy, butoxy, pentyloxy, hexyloxy, or heptyloxy. More preferable is methoxy or ethoxy.

Preferred alkoxymethyl is methoxymethyl, ethoxymethyl, propoxymethyl, butoxymethyl, or pentyloxymethyl. More preferable is methoxymethyl.

"1,4-Phenylene in which any hydrogen may be replaced by fluorine" for $A^1$ is 1,4-phenylene, 2-fluoro-1,4-phenylene, 2,5-difluoro-1,4-phenylene, 2,6-difluoro-1,4-phenylene, 2,3,5-trifluoro-1,4-phenylene, or 2,3,5,6-tetrafluoro-1,4-phenylene. Among these groups, 1,4-phenylene, 2-fluoro-1,4-phenylene, 2,5-difluoro-1,4-phenylene, or 2,6-difluoro-1,4-phenylene is preferable. More preferable is 1,4-phenylene, 2-fluoro-1,4-phenylene, or 2,6-difluoro-1,4-phenylene. The group 1,4-cyclohexylene or 1,3-dioxane-2,5-diyl of the component compounds is preferably in trans configuration than cis configuration.

Fifthly, concrete examples of the component compounds are given. Preferred compounds (1) and (3) to (6) are shown below as compounds (1-1) to (1-2), (3-1) to (3-6), (4-1) to (4-5), (5-1-1) to (5-2-5) and (6-1) to (6-3). No example of compound (2) is given here. $R^1$ and $R^6$ are independently alkyl, and $R^2$ is alkyl or alkenyl.

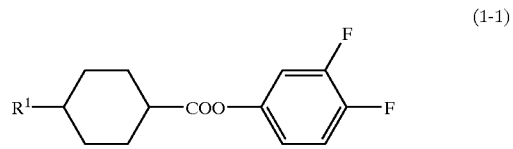

(1-1)

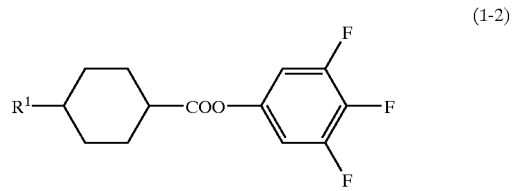

(1-2)

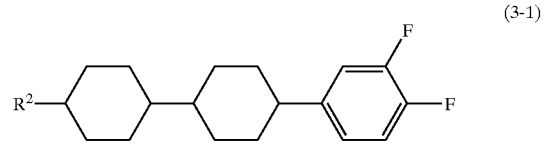

(3-1)

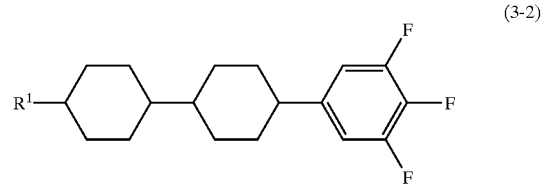

(3-2)

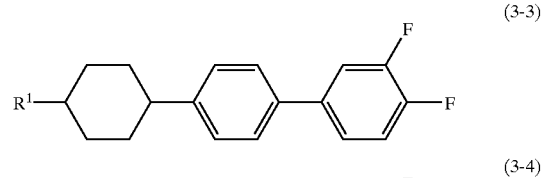

(3-3)

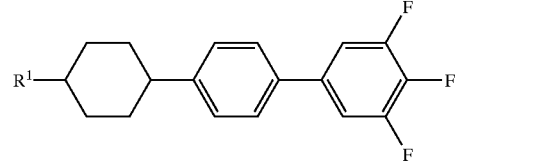

(3-4)

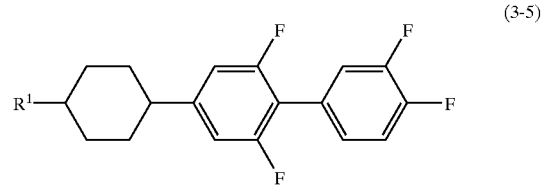

(3-5)

-continued

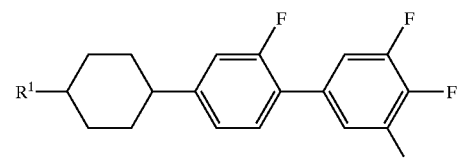
(3-6)

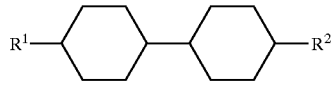
(4-1)

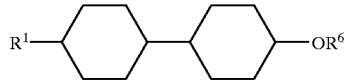
(4-2)

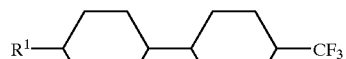
(4-3)

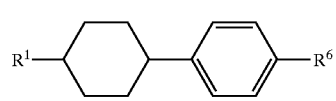
(4-4)

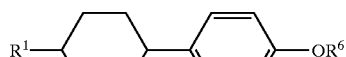
(4-5)

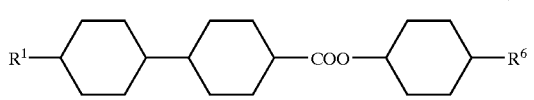
(5-1-1)

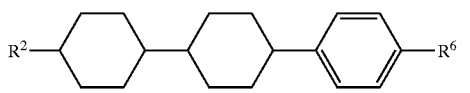
(5-1-2)

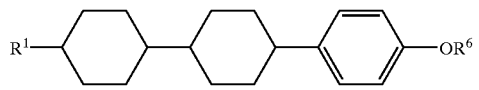
(5-1-3)

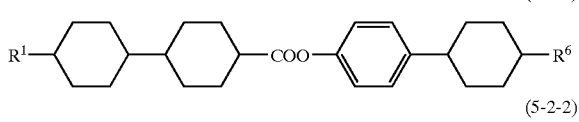
(5-2-1)

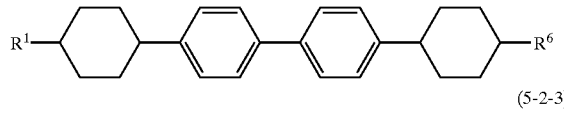
(5-2-2)

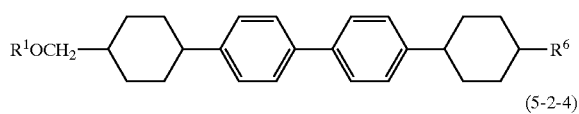
(5-2-3)

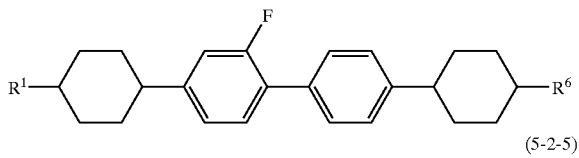
(5-2-4)

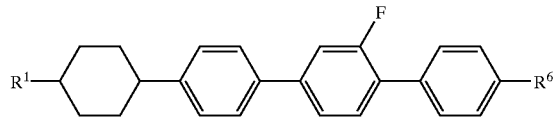
(5-2-5)

-continued

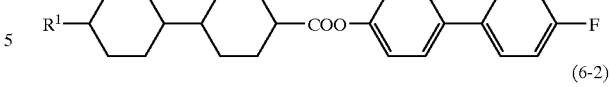
(6-1)

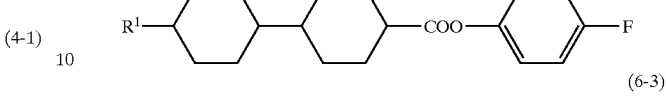
(6-2)

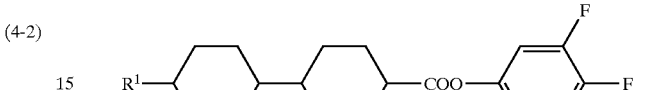
(6-3)

Sixthly, the method for the preparation of the compounds as a component is explained. These compounds can be prepared by known methods as specified below. Compound (1-1) is prepared according to the method disclosed in JP 59-170042 A (1984). Compounds (1-2) and (2) are prepared according to the method described in JP 2-233626 A (1990). Compound (3-1) is prepared according to the method described in JP 57-154135 A (1982). Compound (3-3) is prepared according to the method described in JP 57-185230 A (1982). Compound (4-1) is prepared according to the method described in JP 59-70624 (1984). Compound (4-4) is prepared according to the method described in JP 56-68636 A (1981). Compound (5-1-2) and (5-1-3) are prepared according to the method described in JP 57-165328 A (1982). Compound (5-2-3) is prepared according to the method described in JP 58-219137 A (1983). Compound (5-2-5) is prepared according to the method described in JP 2-237949 A (1990). Compound (6-1) is prepared according to the method described in JP 57-64645 A (1982).

The compounds for which preparation methods are not specified above can be prepared according to the methods described in books such as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so on. The composition is prepared from the compounds thus obtained according to known methods. For example, the component compounds are mixed and heated to dissolve each other to give the composition.

The optical anisotropy of the present composition mainly ranges from 0.07 to 0.14. The composition having the optical anisotropy of 0.07 to 0.18 or 0.06 to 0.20 may be prepared by controlling the mixing ratio of the component compounds or by further mixing any liquid crystal compounds other than the component compounds. An element comprising the composition has a high voltage holding ratio. Accordingly, the composition of the present invention is suitable for an AM element. The composition is especially suitable for an AM-TFT element having polycrystal silicon prepared at low temperatures, because its frequency dependence of the dielectric anisotropy is low. The composition can be used not only for an AM element but also for a PM element. The composition can be used for elements having modes such as PC, TN, STN, ECB, OCB, IPS, VA, and so on. These elements may be reflection type, transmission type or semi-transmission type elements. The composition can also be used for such elements as a nematic curvilinear aligned phase (NCAP) element prepared by microcapsulating the composition and a polymer dispersed (PD) element comprising the composition in which a three-dimensional reticulated polymer is formed, e.g., a polymer network (PN) element.

EXAMPLES

The present invention shall be explained in detail by the following Examples. The present invention is not restricted by these Examples.

Compounds described in Comparative Examples and Examples are expressed by the symbols according to the definition set forth in Table 4. In Table 4, the configuration of 1,4-cyclohexylene and 1,3-dioxane-2,5-diyl is trans. The configuration of a bonding group —CH=CH— is trans. The parenthesized numbers next to the symbolized compounds in Examples correspond to the respective numbers of the preferable compounds. The symbol (–) means a compound other than the component compounds. The characteristics of the composition are given last.

TABLE 4

Method for Description of Compounds Using Symbols
R—(A$_1$)—Z$_1$ ... —Z$_n$—(A$_n$)—X

| | Symbol |
|---|---|
| 1) Left terminal group R— | |
| C$_n$H$_{2n+1}$— | n— |
| C$_n$H$_{2n+1}$O— | nO— |
| C$_n$H$_{2n+1}$OC$_m$H$_{2m}$— | nOm— |
| CH$_2$=CH— | V— |
| CH$_2$=CHC$_n$H$_{2n}$— | Vn— |
| 2) Ring structure —(An)— | |
| (benzene) | B |
| (F-benzene) | B(F) |
| (F,F-benzene) | B(F, F) |
| (Cl-benzene) | B(CL) |
| (cyclohexane) | H |
| (dioxane) | G |

TABLE 4-continued

Method for Description of Compounds Using Symbols
R—(A$_1$)—Z$_1$ ... —Z$_n$—(A$_n$)—X

| | Symbol |
|---|---|
| 3) Bonding group —Z$_n$— | |
| —C$_2$H$_4$— | 2 |
| —COO— | E |
| —CF$_2$O— | CF2O |
| 4) Right terminal group —X | |
| —F | —F |
| —Cl | —CL |
| —C$_n$H$_{2n+1}$ | —n |
| —OC$_n$H$_{2n+1}$ | —On |
| —CH=CH$_2$ | —V |
| —CF$_3$ | —CF3 |
| —OCF$_3$ | —OCF$_3$ |
| —COOCH$_3$ | —EMe |
| 5) Examples of Description | |

Example 1. 5-HEB(F,F)—F

C$_5$H$_{11}$—[cyclohexyl]—COO—[F,F-benzene]—F

Example 2. 101-HBBH-5

CH$_3$OCH$_2$—[cyclohexyl]—[benzene]—[benzene]—[cyclohexyl]—C$_5$H$_{11}$

Example 3. 3-GHB(F,F)-F

C$_3$H$_7$—[dioxane]—[cyclohexyl]—[F,F-benzene]—F

The characteristic values were measured according to the following methods:

Upper limit temperature of a nematic phase (NI; ° C.): A sample was placed on a hot plate in a melting point measuring apparatus equipped with a polarization microscope and was heated at the rate of 1° C. per minute. The temperature was measured when a part of the sample began to change from a nematic phase into an isotropic liquid. The upper limit temperature of a nematic phase may be abbreviated to "upper limit temperature".

Lower limit temperature of a nematic phase (Tc; ° C.): A sample having a nematic phase was kept in a freezer at 0° C., –10° C., –20° C., –30° C., and –40° C., respectively, for ten days to observe a liquid crystal phase. For example, when the sample stayed in a nematic phase at –20° C. and changed to crystals or a smectic phase at –30° C., Tc is expressed as <–20° C. The lower limit temperature of a nematic phase may be abbreviated to "lower limit temperature".

Optical anisotropy (Δn; measured at 25° C.): Optical anisotropy was measured using Abbe refractometer by the aid of a light having wavelength of 589 nm.

Viscosity (η; mPa·s, measured at 20° C. and –10° C.): An E-type viscometer was used for measurement of viscosity.

Dielectric anisotropy (Δε; measured at 25° C.): A sample was poured into a TN element, in which a distance between two glass plates (cell gap) is 9 μm and a twist angle is 80 degrees. A dielectric constant ($\epsilon\|$) that is parallel to a liquid crystal molecule was measured by applying 10 volts to the cell. A dielectric constant ($\epsilon\perp$) that is perpendicular to a liquid crystal molecule was measured by applying 0.5 volt. A value of dielectric anisotropy was calculated from the equation: $\Delta\epsilon=\epsilon\|-\epsilon\perp$. A composition having positive dielectric anisotropy was measured by this method. When a sample is a compound, the compound was mixed into an appropriate composition to measure the dielectric anisotropy.

Threshold voltage (Vth; measured at 25° C.; V): A sample was poured into a TN element having a normally white mode, in which a distance between two glass plates (call gap) was $(0.5/\Delta n)$ μm and a twist angle was 80 degrees. $\Delta n$ is a value of optical anisotropy measured by the method described above. Rectangle waves with a frequency of 32 Hz were applied to the element. Voltage of the rectangle waves was increased and a value of the voltage was measured when transmittance of the light passing through the element reached 90%.

Voltage holding ratio (VHR; measured at 25° C. and 80° C.; %): A voltage holding ratio was measured according to the method described in EIAJ •ED-2521A of Standard of Electric Industries Association of Japan for measuring a voltage holding ratio of an element having a liquid crystal composition and an aligning film. A TN element used for the measurement had a polyimide aligning film and a cell gap of 6 μm. A wave form of the voltage applied on the TN element at 25° C. was measured using a cathode ray oscilloscope to determine an area between a voltage curve and a horizontal line in a unit frequency. A voltage holding ratio was calculated by a comparison between the above mentioned area and an area determined in the same way using a wave form measured without the NT element. The measured value is described as VHR (25° C.). Next, a voltage holding ratio of the TN element was measured at 80° C. The value measured was described as VHR (80° C.).

Frequency dependence of dielectric anisotropy ($\Delta\epsilon$(5 kHz)/$\Delta\epsilon$ (50 Hz); −20° C.): A sample was poured into a TN element having a normally white mode, in which a distance between two glass plates (cell gap) is $(0.5/\Delta n)$ μm and a twist angle is 80 degrees. $\Delta n$ is a value of optical anisotropy measured by the method described above. The TN element was cooled to −20° C., on which 10 volts with sine waves of 5 kHz was applied to measure a dielectric constant ($\epsilon\|$) that is parallel to a liquid crystal molecule. A dielectric constant ($\epsilon\perp$) that is perpendicular to a liquid crystal molecule was measured by applying 0.5 volt with sine waves of 5 kHz. A value of dielectric anisotropy [$\Delta\epsilon$(5 kHz)] was calculated from the equation: $\Delta\epsilon=\epsilon\|-\epsilon\perp$. Next, a value of dielectric anisotropy [$\Delta\epsilon$(50 Hz)] was obtained in a similar manner by applying sine waves of 50 Hz. Frequency dependence was calculated based on the ratio between these values. When the ratio is close to 1, frequency dependence is low, namely, frequency dependence is excellent. The frequency dependence of dielectric anisotropy may be abbreviated to "frequency dependence".

Comparative Example 1

The composition of Example 4 disclosed in JP 8-73857 A (1996) is chosen here, because it contains compound (1) of the present invention. The components and characteristics of the composition are described below. This composition has a low upper limit temperature, a high lower limit temperature, and a high frequency dependence.

| | |
|---|---|
| 2-HEB (F, F)-F | 10% |
| 5-HHEB (F, F)-F | 5% |
| 3-BBEB (F, F)-F | 5% |
| 4-BBEB (F, F)-F | 5% |
| 2-HHB (CL)-CL | 3% |
| 2-H2HB (F)-CL | 5% |
| 4-HHB-CL | 10% |
| 2-HBB-CL | 3% |
| 7-HB (F)-F | 5% |
| 7-HB (F, F)-F | 5% |
| 3-HBB (F, F)-F | 15% |
| 5-HBB (F, F)-F | 15% |
| 3-H2BB (F, F)-F | 5% |
| 4-H2BB (F, F)-F | 5% |
| 5-H2BB (F, F)-F | 4% |

NI = 48.6° C.; $T_c$ < −20° C.; $\Delta n$ = 0.096; η = 30.1 mPa · s; Vth = 1.12 V; VHR (25° C.) = 98.4%; VHR (80° C.) = 97.1%; $\Delta\epsilon$ (5 kHz)/$\Delta\epsilon$ (50 Hz) = 0.41.

Comparative Example 2

The composition of Example 6 disclosed in JP 10-231482 A (1998) is chosen here, because it contains compound (2) of the present invention and has a lowest threshold voltage. The components and characteristics of the composition are described below. This composition shows a high lower limit temperature, a high viscosity, a high threshold voltage, and a high frequency dependence.

| | |
|---|---|
| 2-GHB (F, F)-F | 5% |
| 3-GHB (F, F)-F | 5% |
| 5-GHB (F, F)-F | 5% |
| 2-GBB (F, F)-F | 5% |
| 3-GBB (F, F)-F | 5% |
| 5-GBB (F, F)-F | 5% |
| 3-H2HB (F, F)-F | 12% |
| 4-H2HB (F, F)-F | 10% |
| 3-HBB (F, F)-F | 15% |
| 3-HHEB (F, F)-F | 10% |
| 2-HBEB (F, F)-F | 3% |
| 3-HBEB (F, F)-F | 5% |
| 5-HBEB (F, F)-F | 3% |
| 2-HHBB (F, F)-F | 3% |
| 3-HHBB (F, F)-F | 3% |
| 4-HHBB (F, F)-F | 3% |
| 3-HH2BB (F, F)-F | 3% |

NI = 80.9° C.; $T_c$ < −20° C.; $\Delta n$ = 0.100; η = 49.4 mPa · s; Vth = 1.35 V; VHR (25° C.) = 98.4%; VHR (80° C.) = 96.7%; $\Delta\epsilon$ (5 kHz)/$\Delta\epsilon$ (50 Hz) = 0.24.

Comparative Example 3

The composition of Example 12 disclosed in JP 2000-144135 A (2000) is chosen here, because it contains compounds (1) and (2) of the present invention. The components and characteristics of the composition are described below. This composition has a low upper limit temperature, a high frequency dependence, and a low VHR (80° C.)

| | |
|---|---|
| 3-HH-EMe | 25% |
| 5-HH-EMe | 10% |
| 3-HHEB (F, F)-F | 8% |
| 2-HGB (F, F)-F | 6% |
| 3-HGB (F, F)-F | 3% |
| 4-HGB (F, F)-F | 4% |
| 5-HGB (F, F)-F | 7% |
| 2-H2GB (F, F)-F | 4% |

-continued

| | |
|---|---|
| 3-H2GB (F, F)-F | 6% |
| 4-H2GB (F, F)-F | 4% |
| 5-GHB (F, F)-F | 10% |
| 5-HEB (F, F)-F | 6% |
| 3-HHEB-F | 4% |
| 5-HHEB-F | 3% |
| NI = 71.0° C.; $T_c$ < −30° C.; Δn = 0.062; η = 24.8 mPa·s; Vth = 1.22 V; VHR (25° C.) = 98.4%; VHR (80° C.) = 94.3%; Δε (5 kHz)/Δε (50 Hz) = 0.37. | |

Comparative Example 4

The composition of Example 4 disclosed in JP 2001-3053 A (2001) is chosen here, because it contains compound (2) of the present invention. The components and characteristics of the composition are described below. This composition has a low upper limit temperature, a high lower limit temperature, and a high frequency dependence.

| | |
|---|---|
| 2-BB (F, F) CF2OB (F, F)-F | 10% |
| 3-BB (F, F) CF2OB (F, F)-F | 15% |
| 2-HBB (F, F) CF2OB (F, F)-F | 10% |
| 3-HBB (F, F) CF2OB (F, F)-F | 10% |
| 2-BB (F, F) CF2OBB (F)-F | 9% |
| 3-BB (F, F) CF2OBB (F)-F | 9% |
| 3-BB (F, F) CF2OBB (F)-OCF3 | 7% |
| 3-HHB (F, F)-F | 7% |
| 4-HHB (F, F)-F | 4% |
| 3-H2HB (F, F)-F | 7% |
| 3-HGB (F, F)-F | 6% |
| 3-GHB (F, F)-F | 6% |
| NI = 76.1° C.; $T_c$ < −20° C.; Δn = 0.132; η = 38.0 mPa·s; Vth = 0.96 V; VHR (25° C.) = 98.7%; VHR (80° C.) = 97.5%; Δε (5 kHz)/Δε (50 Hz) = 0.22. | |

Comparative Example 5

The composition of Example 6 disclosed in JP 2001-288470 A (2001) is chosen here, because it contains compound (1) and (2) of the present invention. The components and characteristics of the composition are described below. This composition has a high lower limit temperature, a high threshold voltage, and a high frequency dependence.

| | |
|---|---|
| 3-HEH-3 | 3% |
| 4-HEH-3 | 3% |
| 3-HHEH-3 | 3% |
| 4-HHEH-3 | 3% |
| 5-HB-CL | 5% |
| 3-HEB-F | 3% |
| 5-HEB (F, F)-F | 3% |
| 3-HHB (F)-OCF3 | 4% |
| 3-HHB (F)-OCF3 | 6% |
| 3-GHB (F, F)-F | 5% |
| 3-HGB (F, F)-F | 10% |
| 5-HGB (F, F)-F | 9% |
| 3-H2GB (F, F)-F | 5% |
| 3-HHEB-F | 6% |
| 5-HHEB-F | 5% |
| 3-HHEB (F, F)-F | 10% |
| 4-HHEB (F, F)-F | 5% |
| 3-HH-4 | 8% |
| 3-HB-O2 | 4% |
| NI = 83.7° C.; $T_c$ < −20° C.; Δn = 0.065; η = 23.2 mPa·s; Vth = 1.42 V; VHR (25° C.) = 98.8%; VHR (80° C.) = 97.9%; Δε (5 kHz)/Δε (50 Hz) = 0.34. | |

Example 1

| | | |
|---|---|---|
| 5-HEB (F)-F | (1-1) | 3% |
| 5-HEB (F, F)-F | (1-2) | 7% |
| 5-GHB (F, F)-F | (2) | 18% |
| V-HHB (F)-F | (3-1) | 5% |
| 2-HHB (F, F)-F | (3-2) | 10% |
| 3-HHB (F, F)-F | (3-2) | 10% |
| 3-HB (F, F) B (F)-F | (3-5) | 5% |
| 3-HB (F) B (F, F)-F | (3-6) | 5% |
| 5-HH-V | (4-1) | 5% |
| V2-HH-3 | (4-1) | 4% |
| 3-HH-O1 | (4-2) | 3% |
| 3-HH-CF3 | (4-3) | 3% |
| 3-HHEH-3 | (5-1-1) | 3% |
| 3-HHEH-4 | (5-1-1) | 3% |
| 3-HHEH-5 | (5-1-1) | 3% |
| V-HHB-1 | (5-1-2) | 5% |
| 3-HHEBH-3 | (5-2-1) | 2% |
| 3-HHEBH-4 | (5-2-1) | 2% |
| 5-HBBH-3 | (5-2-2) | 2% |
| 5-HB (F) BH-3 | (5-2-4) | 2% |
| NI = 81.4° C.; $T_c$ < −30° C.; Δn = 0.078; η = 27.6 mPa·s; Vth = 1.19 V; VHR (25° C.) = 98.8%; VHR (80° C.) = 98.2%; Δε (5 kHz)/Δε (50 Hz) = 0.52. | | |

Example 2

| | | |
|---|---|---|
| 5-HEB (F, F)-F | (1-2) | 15% |
| 3-GHB (F, F)-F | (2) | 3% |
| 5-GHB (F, F)-F | (2) | 18% |
| 3-HHB (F)-F | (3-1) | 8% |
| 2-HHB (F, F)-F | (3-2) | 5% |
| 3-HHB (F, F)-F | (3-2) | 10% |
| 3-HBB (F, F)-F | (3-4) | 15% |
| 3-HH-4 | (4-1) | 4% |
| 5-HH-V | (4-1) | 5% |
| 3-HHB-1 | (5-1-2) | 4% |
| 3-HHB-3 | (5-1-2) | 3% |
| 3-HHEBH-3 | (5-2-1) | 5% |
| 3-HHEBH-4 | (5-2-1) | 5% |
| NI = 81.5° C.; $T_c$ < −30° C.; Δn = 0.080; η = 29.6 mPa·s; Vth = 1.14 V; VHR (25° C.) = 98.9%; VHR (80° C.) = 98.4%; Δε (5 kHz)/Δε (50 Hz) = 0.65. | | |

Example 3

| | | |
|---|---|---|
| 5-HEB (F, F)-F | (1-2) | 13% |
| 3-GHB (F, F)-F | (2) | 4% |
| 5-GHB (F, F)-F | (2) | 20% |
| 2-HHB (F, F)-F | (3-2) | 6% |
| 3-HHB (F, F)-F | (3-2) | 10% |
| 3-HBB (F, F)-F | (3-4) | 17% |
| 3-HH-4 | (4-1) | 5% |
| 3-HHB-1 | (5-1-2) | 4% |
| 3-HHB-O1 | (5-1-3) | 3% |
| 101-HBBH-4 | (5-2-3) | 5% |
| 101-HBBH-5 | (5-2-3) | 5% |
| 5-HBB (F) B-2 | (5-2-5) | 3% |
| 5-HBB (F) B-3 | (5-2-5) | 3% |
| 101-HEB (F, F)-F | (-) | 2% |
| NI = 87.3° C.; $T_c$ < −30° C.; Δn = 0.098; η = 34.7 mPa·s; Vth = 1.12 V; VHR (25° C.) = 98.8%; VHR (80° C.) = 98.3%; Δε (5 kHz)/Δε (50 Hz) = 0.66. | | |

Example 4

| | | |
|---|---|---|
| 5-HEB (F, F)-F | (1-2) | 12% |
| 3-GHB (F, F)-F | (2) | 3% |
| 4-GHB (F, F)-F | (2) | 6% |
| 5-GHB (F, F)-F | (2) | 14% |
| 3-HBB (F, F)-F | (3-4) | 19% |
| 3-HH-4 | (4-1) | 10% |
| 1O1-HBBH-4 | (5-2-3) | 5% |
| 1O1-HBBH-5 | (5-2-3) | 6% |
| 3-HHEBB-F | (6-1) | 4% |
| 3-HHEB-F | (6-2) | 3% |
| 2-HHEB (F, F)-F | (6-3) | 8% |
| 3-HHEB (F, F)-F | (6-3) | 10% |

NI = 87.4° C.; $T_c$ < −30° C.; $\Delta n$ = 0.089; $\eta$ = 35.7 mPa · s; Vth = 1.12 V; VHR (25° C.) = 99.0%; VHR (80° C.) = 98.4%; $\Delta\epsilon$ (5 kHz)/$\Delta\epsilon$ (50 Hz) = 0.62.

Example 5

| | | |
|---|---|---|
| 5-HEB(F, F)-F | (1-2) | 10% |
| 3-GHB(F, F)-F | (2) | 2% |
| 4-GHB(F, F)-F | (2) | 6% |
| 5-GHB(F, F)-F | (2) | 17% |
| 3-HHB(F)-F | (3-1) | 12% |
| 2-HHB(F, F)-F | (3-2) | 9% |
| 3-HHB(F, F)-F | (3-2) | 10% |
| 3-HH-4 | (4-1) | 10% |
| 1O1-HBBH-4 | (5-2-3) | 4% |
| 1O1-HBBH-5 | (5-2-3) | 4% |
| 3-HHEB-F | (6-2) | 6% |
| 3-HHEB(F, F)-F | (6-3) | 10% |

NI = 83.8° C.; $T_c$ < −30° C.; $\Delta n$ = 0.074; $\eta$ = 32.0 mPa · s; Vth = 1.11 V; VHR (25° C.) = 98.9%; VHR (80° C.) = 98.3%; $\Delta\epsilon$ (5 kHz)/$\Delta\epsilon$ (50 Hz) = 0.56.

Example 6

| | | |
|---|---|---|
| 5-HEB(F, F)-F | (1-2) | 10% |
| 3-GHB(F, F)-F | (2) | 5% |
| 5-GHB(F, F)-F | (2) | 20% |
| 3-HHB(F, F)-F | (3-2) | 5% |
| 3-HBB(F)-F | (3-3) | 10% |
| 2-HBB(F, F)-F | (3-4) | 5% |
| 2-HH-5 | (4-1) | 5% |
| 3-HH-4 | (4-1) | 5% |
| 7-HB-1 | (4-4) | 4% |
| 3-HB-O2 | (4-5) | 5% |
| 3-HHB-1 | (5-1-2) | 4% |
| 3-HHB-O1 | (5-1-3) | 3% |
| 3-HHEBH-3 | (5-2-1) | 3% |
| 3-HHEBH-4 | (5-2-1) | 3% |
| 3-HHEBH-5 | (5-2-1) | 3% |
| 3-HHEB(F, F)-F | (6-3) | 10% |

NI = 81.5° C.; $T_c$ < −30° C.; $\Delta n$ = 0.081; $\eta$ = 29.4 mPa · s; Vth = 1.17 V; VHR (25° C.) = 98.8%; VHR (80° C.) = 98.3%; $\Delta\epsilon$ (5 kHz)/$\Delta\epsilon$ (50 Hz) = 0.55.

Example 7

| | | |
|---|---|---|
| 5-HEB(F, F)-F | (1-2) | 12% |
| 3-GHB(F, F)-F | (2) | 3% |
| 4-GHB(F, F)-F | (2) | 3% |
| 5-GHB(F, F)-F | (2) | 20% |
| 2-HHB(F, F)-F | (3-2) | 5% |
| 3-HHB(F, F)-F | (3-2) | 10% |
| 3-HBB(F, F)-F | (3-4) | 10% |
| 3-HH-4 | (4-1) | 10% |
| 1O1-HBBH-5 | (5-2-3) | 5% |
| 5-HBB(F)B-3 | (5-2-5) | 3% |
| 3-HHEBB-F | (6-1) | 3% |
| 5-HHEB-F | (6-2) | 3% |
| 2-HHEB(F, F)-F | (6-3) | 3% |
| 3-HHEB(F, F)-F | (6-3) | 10% |

NI = 81.1° C.; $T_c$ < −30° C.; $\Delta n$ = 0.084; $\eta$ = 34.4 mPa · s; Vth = 1.06 V; VHR (25° C.) = 98.7%; VHR (80° C.) = 98.3%; $\Delta\epsilon$ (5 kHz)/$\Delta\epsilon$ (50 Hz) = 0.61.

Example 8

| | | |
|---|---|---|
| 5-HEB(F, F)-F | (1-2) | 15% |
| 3-GHB(F, F)-F | (2) | 3% |
| 4-GHB(F, F)-F | (2) | 5% |
| 5-GHB(F, F)-F | (2) | 15% |
| 2-HHB(F)-F | (3-1) | 5% |
| 2-HHB(F, F)-F | (3-2) | 5% |
| 2-HBB(F)-F | (3-3) | 5% |
| 3-HBB(F, F)-F | (3-4) | 5% |
| 2-HH-5 | (4-1) | 5% |
| 3-HB-O2 | (4-5) | 5% |
| 1O1-HBBH-4 | (5-2-3) | 5% |
| 1O1-HBBH-5 | (5-2-3) | 5% |
| 3-HHEBB-F | (6-1) | 5% |
| 3-HHEB-F | (6-2) | 5% |
| 2-HHEB(F, F)-F | (6-3) | 5% |
| 3-HHEB(F, F)-F | (6-3) | 7% |

NI = 83.0° C.; $T_c$ < −30° C.; $\Delta n$ = 0.083; $\eta$ = 34.2 mPa · s; Vth = 1.08 V; VHR (25° C.) = 98.9%; VHR (80° C.) = 98.4%; $\Delta\epsilon$ (5 kHz)/$\Delta\epsilon$ (50 Hz) = 0.68.

Example 9

| | | |
|---|---|---|
| 5-HEB(F, F)-F | (1-2) | 12% |
| 3-GHB(F, F)-F | (2) | 3% |
| 4-GHB(F, F)-F | (2) | 4% |
| 5-GHB(F, F)-F | (2) | 20% |
| 2-HHB(F, F)-F | (3-2) | 3% |
| 3-HHB(F, F)-F | (3-2) | 10% |
| 3-HBB(F, F)-F | (3-4) | 10% |
| 2-HH-5 | (4-1) | 5% |
| 3-HH-4 | (4-1) | 5% |
| 3-HHB-3 | (5-1-3) | 4% |
| 1O1-HBBH-4 | (5-2-3) | 4% |
| 1O1-HBBH-5 | (5-2-3) | 5% |
| 5-HHEBB-F | (6-1) | 2% |
| 2-HHEB(F, F)-F | (6-3) | 3% |
| 3-HHEB(F, F)-F | (6-3) | 10% |

NI = 81.0° C.; $T_c$ < −30° C.; $\Delta n$ = 0.082; $\eta$ = 34.9 mPa · s; Vth = 1.07 V; VHR (25° C.) = 99.0%; VHR (80° C.) = 98.5%; $\Delta\epsilon$ (5 kHz)/$\Delta\epsilon$ (50 Hz) = 0.64.

Example 10

| | | |
|---|---|---|
| 5-HEB(F, F)-F | (1-2) | 13% |
| 3-GHB(F, F)-F | (2) | 3% |
| 5-GHB(F, F)-F | (2) | 20% |
| 2-HHB(F)-F | (3-1) | 5% |
| 2-HHB(F, F)-F | (3-2) | 7% |
| 2-HBB(F, F)-F | (3-4) | 6% |
| 3-HH-4 | (4-1) | 5% |

-continued

| 3-HHEBH-3 | (5-2-1) | 4% |
| --- | --- | --- |
| 1O1-HBBH-4 | (5-2-3) | 4% |
| 3-HHEBB-F | (6-1) | 3% |
| 5-HHEBB-F | (6-1) | 3% |
| 3-HHEB-F | (6-2) | 5% |
| 5-HHEB-F | (6-2) | 5% |
| 2-HHEB(F, F)-F | (6-3) | 5% |
| 3-HHEB(F, F)-F | (6-3) | 10% |
| 1O1-HEB(F, F)-F | (-) | 2% |

NI = 88.3° C.; $T_c$ <− 30° C.; Δn = 0.079; η = 37.4 mPa · s; Vth = 1.13 V; VHR (25° C.) = 98.8%; VHR (80° C.) = 98.3%; Δε (5 kHz)/Δε (50 Hz) = 0.64.

INDUSTRIAL APPLICABILITY

The liquid crystal composition of this invention satisfies plural characteristics in the general characteristics of a composition, a low threshold voltage, a high resistively, and a low frequency dependence. The composition has plural characteristics appropriately balanced. A liquid crystal display element having the composition has an especially high voltage holding ratio. The composition is especially suitable for an AM-TFT element having polycrystal silicon produced at low temperatures.

What is claimed is:

1. A liquid crystal composition comprising; as a first component, at least one compound selected from a group of compounds represented by Formula (1); as a second component, at least one compound selected from a group of compounds represented by Formula (2); as a third component, at least one compound selected from a group of compounds represented by Formula (3); as a forth component, at least one compound selected from a group of compounds represented by Formula (4); and as a fifth component, at least one compound selected from a group of compounds represented by Formulas (5-1) and (5-2).

(1)

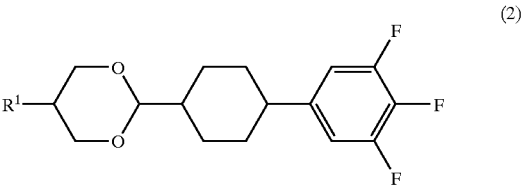
(2)

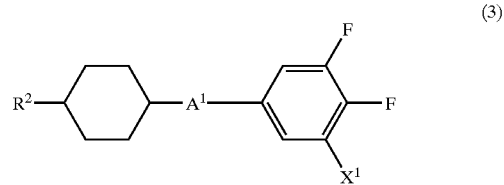
(3)

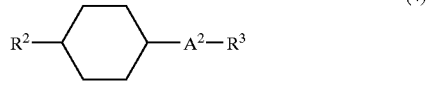
(4)

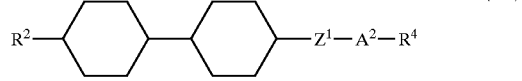
(5-1)

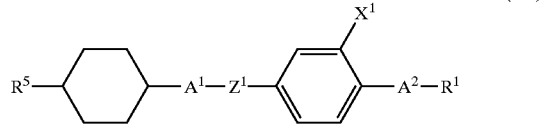
(5-2)

wherein $R^1$ is alkyl; $R^2$ is alkyl or alkenyl; $R^3$ is alkyl, alkoxy, or —$CF_3$; $R^4$ is alkyl or alkoxy; $R^5$ is alkyl or alkoxymethyl; $A^1$ is 1,4-cyclohexylene or 1,4-phenylene in which any hydrogen may be replaced by fluorine; $A^2$ is 1,4-cyclohexylene or 1,4-phenylene; $Z^1$ is a single bond or —COO—; and $X^1$ is hydrogen or fluorine.

2. The liquid crystal composition according to claim 1, wherein the fifth component is at least one compound selected from a group of compounds represented by Formula (5-1).

3. The liquid crystal composition according to claim 1, wherein the fifth component is at least one compound selected from a group of compounds represented by Formula (5-2).

4. The liquid crystal composition according to claim 1, wherein the first component is in the range of 5 to 30% by weight, the second component is in the range of 10 to 40% by weight, the third component is in the range of 10 to 50% by weight, the forth component is in the range of 3 to 30% by weight, and the fifth component is in the range of 3 to 40% by weight, each based on the total weight of the composition.

5. The liquid crystal composition according to claim 2, wherein the first component is in the range of 5 to 30% by weight, the second component is in the range of 10 to 40% by weight, the third component is in the range of 10 to 50% by weight, the forth component is in the range of 3 to 30% by weight, and the fifth component is in the range of 3 to 40% by weight, each based on the total weight of the composition.

6. The liquid crystal composition according to claim 3, wherein the first component is in the range of 5 to 30% by weight, the second component is in the range of 10 to 40% by weight, the third component is in the range of 10 to 50% by weight, the forth component is in the range of 3 to 30% by weight, and the fifth component is in the range of 3 to 40% by weight, each based on the total weight of the composition.

7. The liquid crystal composition according to claim 1, further comprising, as a sixth component, at least one compound selected from a group of compounds represented by Formula (6)

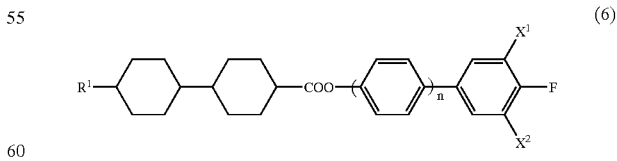
(6)

wherein $R^1$ is alkyl; $X^1$ and $X^2$ independently are hydrogen or fluorine; and n is 0 or 1.

8. The liquid crystal composition according to claim 2, further comprising, as a sixth component, at least one compound selected from a group of compounds represented by Formula (6)

(6)

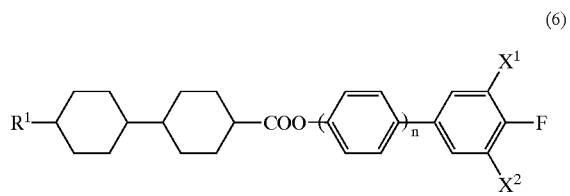

wherein R¹ is alkyl; X¹ and X² independently are hydrogen or fluorine; and n is 0 or 1.

9. The liquid crystal composition according to claim 3, further comprising, as a sixth component, at least one compound selected from a group of compounds represented by Formula (6)

(6)

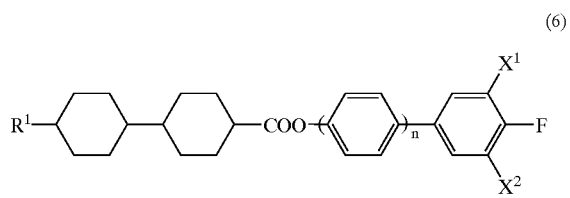

wherein R¹ is alkyl; X¹ and X² independently are hydrogen or fluorine; and n is 0 or 1.

10. The liquid crystal composition according to claim 4, further comprising, as a sixth component, at least one compound selected from a group of compounds represented by Formula (6)

(6)

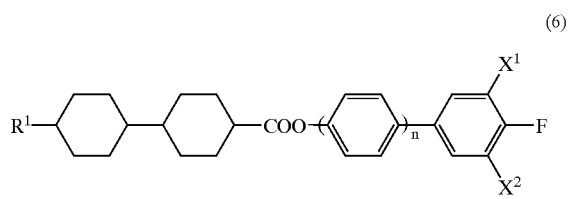

wherein R¹ is alkyl; X¹ and X² independently are hydrogen or fluorine; and n is 0 or 1.

11. The liquid crystal composition according to claim 5, further comprising, as a sixth component, at least one compound selected from a group of compounds represented by Formula (6)

(6)

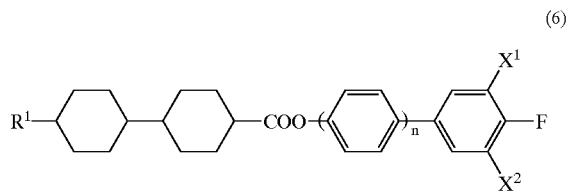

wherein R¹ is alkyl; X¹ and X² independently are hydrogen or fluorine; and n is 0 or 1.

12. The liquid crystal composition according to claim 6, further comprising, as a sixth component, at least one compound selected from a group of compounds represented by Formula (6)

(6)

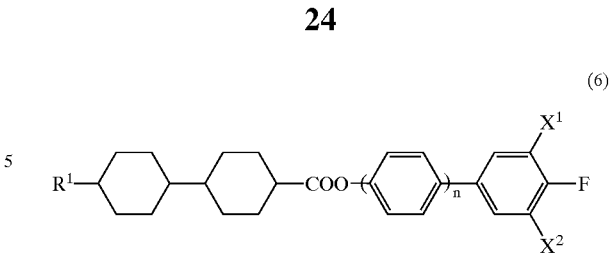

wherein R¹ is alkyl; X¹ and X² independently are hydrogen or fluorine; and n is 0 or 1.

13. The liquid crystal composition according to claim 7, wherein the sixth component is in the range of 1 to 40% by weight based on the total weight of the composition.

14. The liquid crystal composition according to claim 8, wherein the sixth component is in the range of 1 to 40% by weight based on the total weight of the composition.

15. The liquid crystal composition according to claim 9, wherein the sixth component is in the range of 1 to 40% by weight based on the total weight of the composition.

16. The liquid crystal composition according to claim 10, wherein the sixth component is in the range of 1 to 40% by weight based on the total weight of the composition.

17. The liquid crystal composition according to claim 11, wherein the sixth component is in the range of 1 to 40% by weight based on the total weight of the composition.

18. The liquid crystal composition according to claim 12, wherein the sixth component is in the range of 1 to 40% by weight based on the total weight of the composition.

19. A liquid crystal display element comprising the liquid crystal composition according to claim 1.

20. The liquid crystal display element according to claim 19, wherein the liquid crystal display element is an AM element.

21. A liquid crystal display element comprising the liquid crystal composition according to claim 2.

22. A liquid crystal display element comprising the liquid crystal composition according to claim 3.

23. A liquid crystal display element comprising the liquid crystal composition according to claim 4.

24. A liquid crystal display element comprising the liquid crystal composition according to claim 5.

25. A liquid crystal display element comprising the liquid crystal composition according to claim 6.

26. A liquid crystal display element comprising the liquid crystal composition according to claim 7.

27. A liquid crystal display element comprising the liquid crystal composition according to claim 8.

28. A liquid crystal display element comprising the liquid crystal composition according to claim 9.

29. A liquid crystal display element comprising the liquid crystal composition according to claim 10.

30. A liquid crystal display element comprising the liquid crystal composition according to claim 11.

31. A liquid crystal display element comprising the liquid crystal composition according to claim 12.

32. A liquid crystal display element comprising the liquid crystal composition according to claim 13.

33. A liquid crystal display element comprising the liquid crystal composition according to claim 14.

34. A liquid crystal display element comprising the liquid crystal composition according to claim 15.

35. A liquid crystal display element comprising the liquid crystal composition according to claim 16.

36. A liquid crystal display element comprising the liquid crystal composition according to claim 17.

37. A liquid crystal display element comprising the liquid crystal composition according to claim 18.

38. The liquid crystal display element according to claim 21, wherein the liquid crystal display element is an AM element.

39. The liquid crystal display element according to claim 22, wherein the liquid crystal display element is an AM element.

40. The liquid crystal display element according to claim 23, wherein the liquid crystal display element is an AM element.

41. The liquid crystal display element according to claim 24, wherein the liquid crystal display element is an AM element.

42. The liquid crystal display element according to claim 25, wherein the liquid crystal display element is an AM element.

43. The liquid crystal display element according to claim 26, wherein the liquid crystal display element is an AM element.

44. The liquid crystal display element according to claim 27, wherein the liquid crystal display element is an AM element.

45. The liquid crystal display element according to claim 28, wherein the liquid crystal display element is an AM element.

46. The liquid crystal display element according to claim 29, wherein the liquid crystal display element is an AM element.

47. The liquid crystal display element according to claim 30, wherein the liquid crystal display element is an AM element.

48. The liquid crystal display element according to claim 31, wherein the liquid crystal display element is an AM element.

49. The liquid crystal display element according to claim 32, wherein the liquid crystal display element is an AM element.

50. The liquid crystal display element according to claim 33, wherein the liquid crystal display element is an AM element.

51. The liquid crystal display element according to claim 34, wherein the liquid crystal display element is an AM element.

52. The liquid crystal display element according to claim 35, wherein the liquid crystal display element is an AM element.

53. The liquid crystal display element according to claim 36, wherein the liquid crystal display element is an AM element.

54. The liquid crystal display element according to claim 37, wherein the liquid crystal display element is an AM element.

* * * * *